Sept. 5, 1961    G. H. SNYDER, JR    2,998,879
SLIDE CONTAINER
Filed June 24, 1957

INVENTOR:
GEORGE H. SNYDER JR.
BY Howson & Howson
ATTYS.

United States Patent Office 2,998,879
Patented Sept. 5, 1961

2,998,879
SLIDE CONTAINER
George H. Snyder, Jr., Wyncote, Pa., assignor to George H. Snyder, Inc., Philadelphia, Pa., a corporation of Pennsylvania
Filed June 24, 1957, Ser. No. 667,523
3 Claims. (Cl. 206—1)

The present invention relates broadly to slide containers, and more specifically to containers for a plurality of slides such as glass slides used in microscope investigations, or the like, and which are positioned in the container in side by side relationship and in upright position.

While the present invention can be utilized as a storage and shipping container for slides, cards, plates or other similar articles where it is desired to maintain them in upright position after removal of a number thereof, the present invention is particularly useful and adapted for the storage of glass microscope slides which, when packed by the manufacturer, are free of contamination, dirt or smudges and which in order to permit proper microscope analysis of specimens placed thereon must be maintained in a clean condition.

It has been found that after removal of a plurality of such glass slides from a container or box, there is a tendency for the slides to fall into a horizontal position in the bottom of the box, necessitating handling of the slides in areas intermediate their ends or edges. Such handling smudges or dirties the slides. Correct removal is effected by grasping the edges or ends of the slides between the fingers which eliminates dirtying or smudging of the glass surfaces, and permits proper microscope analysis of specimens thereon.

The present invention accordingly has as its primary object the provision of a container or box for glass slides of this nature, of a construction whereby the slides can be maintained in upstanding position even after removal of substantially all of the slides from the box.

Another object of the present invention is to provide in such a container construction, a simple, effective and inexpensive arrangement of means for progressively blocking off portions of the box interior as slides are removed for use.

Another object of the present invention is to provide a construction for such a box which can be reused or readjusted to compensate for a greater or lesser number of slides contained therein, and maintain them in upstanding position for easy access for removal without the danger of smudging the slide faces.

Other and further objects and advantages of the present invention will be more readily apparent from the following detailed description of an embodiment thereof when taken together with the accompanying drawings in which.

Figure 1:
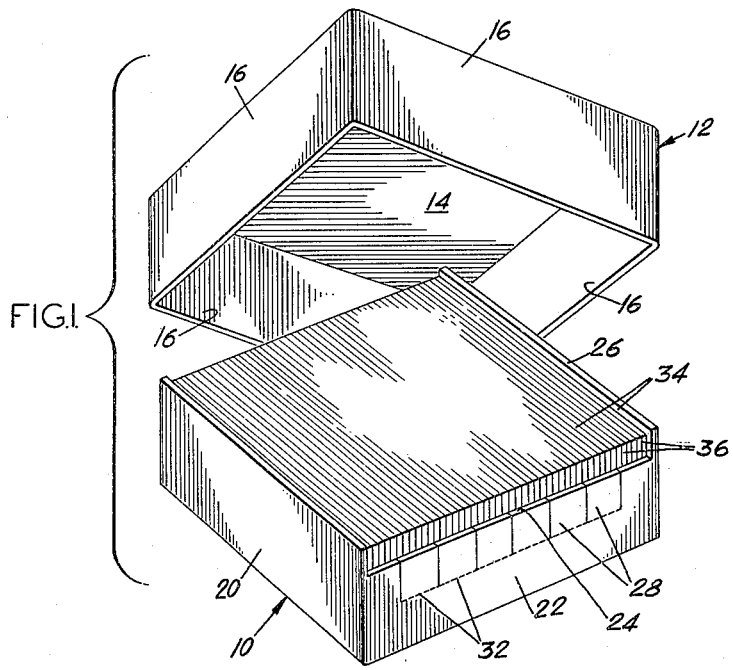
FIG. 1 is an exploded perspective view of the bottom and top portions of the container of the invention.

The container of the present invention includes, broadly designated, a bottom portion 10 and a top or cover 12. The boxes or containers preferably are covered and of a substantially rigid material such as cardboard. The top 12 is of a usual construction including a top 14 and depending sides 16 in assembled relationship as shown in FIG. 1 of the drawings.

The bottom portion 10 of the box or container includes a planar bottom 18 and upstanding ends 20 in fixed relationship to the bottom 18. Sides 22 interconnect the ends 20 and are likewise in fixed relationship with respect to the bottom 18.

Figure 2:
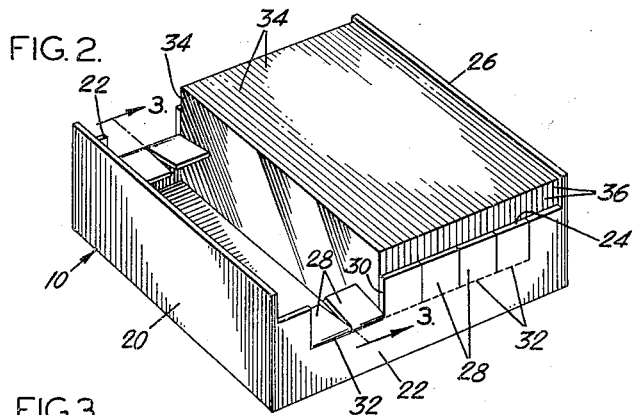
FIG. 2 is a perspective view of the container bottom after removal of a plurality of slides, and in adjusted position for maintaining the upstanding arrangement of the remaining slides.
Figure 3:
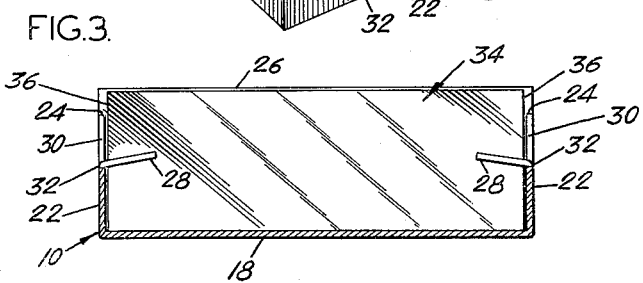
FIG. 3 is a sectional view taken on line 3—3 of FIG. 2.

The sides 22 are recessed or have their top edges 24 terminating below the top edges 26 of the ends 20. A plurality of bendable tabs 28 are provided in sides 22 by cutting into the material of the sides as at 30, and having their lower extremities defined by score lines or the like 32. As shown in FIGS. 2 and 3 of the drawings, these tabs 28 can be bent inwardly into the interior of the bottom 10, and when so positioned limit the area of the bottom surface within the bottom 10, as also decreasing the longitudinal extremities of the interior surfaces of the sides 22.

A plurality of glass slides 34 are positioned in the bottom 10 in side by side relationship, and in vertical or upstanding arrangement as shown in the drawings. As initially packed, the bottom 10 is filled with these glass slides as shown in FIG. 1. After removal of several of the glass slides for use, so that sufficient area is left between the glass slides and an end side 20 to permit the glass slides to fall into the bottom of the box, opposed ones of the tabs 28 are bent inwardly as indicated in FIGS. 2 and 3 behind the remaining glass slides. In this position, the tabs will serve to maintain the remaining slides in upstanding or vertical position as shown. Due to the recessed upper edge 24, access to the edges 36 of the glass slides is provided so that the fingers of a technician can grasp the ends of the slides, without smudging or dirtying the faces thereof, for removal or replacement.

Due to the construction and arrangement of parts, the present container can also be readjusted by bending tabs upwardly for reinsertion of slides into the container bottom.

It will be readily apparent from the foregoing, that the present invention provides a very simple and yet extremely effective container for glass slides or the like, permitting easy removal of any number and means for maintaining the remaining slides in upstanding position, whereby the possibility of smudging or dirtying the faces is eliminated.

Manifestly minor changes in details of construction will be apparent to those skilled in the art to which the invention pertains without departing from the spirit or scope thereof as defined in and limited solely by the appended claims.

I claim:

1. A container of relatively stiff material for glass slides, or the like, including a bottom and upstanding sides thereon, opposed ones of said sides having a plurality of contiguous bendable tabs in the upper portions thereof defined by substantially vertical cuts in the material, the upper ends of said tabs terminating in the planes of the top edges of said opposed sides, said tabs being adapted for bending inwardly into the interior of the container below said top edges to a self-retaining position extending substantially transversely of said opposed sides, each of said tabs on one of said opposed sides being substantially aligned respectively with one of said tabs on the other of said opposed sides and being spaced therefrom in the transversely extending, inwardly bent position to substantially equally limit the longitudinal extent of said opposed sides for maintaining slides vertically arranged therein in upstanding position, the sides disposed between said opposed sides extending above the top edges of said opposed sides and being longitudinally unbroken.

2. A container as claimed in claim 1, wherein said container is composed of a stiff paperboard material, and wherein said tabs are defined by parallel vertical cuts respectively aligned in the material of said opposed sides and forming continuous lines of contiguous side by side positioned tabs.

3. A container as claimed in claim 2, the lower edges of said tabs being defined by a bend line parallel with the top edges of said sides.

References Cited in the file of this patent

UNITED STATES PATENTS

| | | |
|---|---|---|
| 525,585 | Brown | Sept. 4, 1894 |
| 877,757 | Comings | Jan. 28, 1908 |
| 1,824,491 | Molins | Sept. 22, 1931 |
| 2,084,308 | Behr | June 22, 1937 |
| 2,532,808 | Grinnell | Dec. 5, 1950 |